March 29, 1932. R. D. NYE 1,851,921
MANIPULATOR FOR ROLLING MILLS
Filed Oct. 1, 1930 2 Sheets-Sheet 1
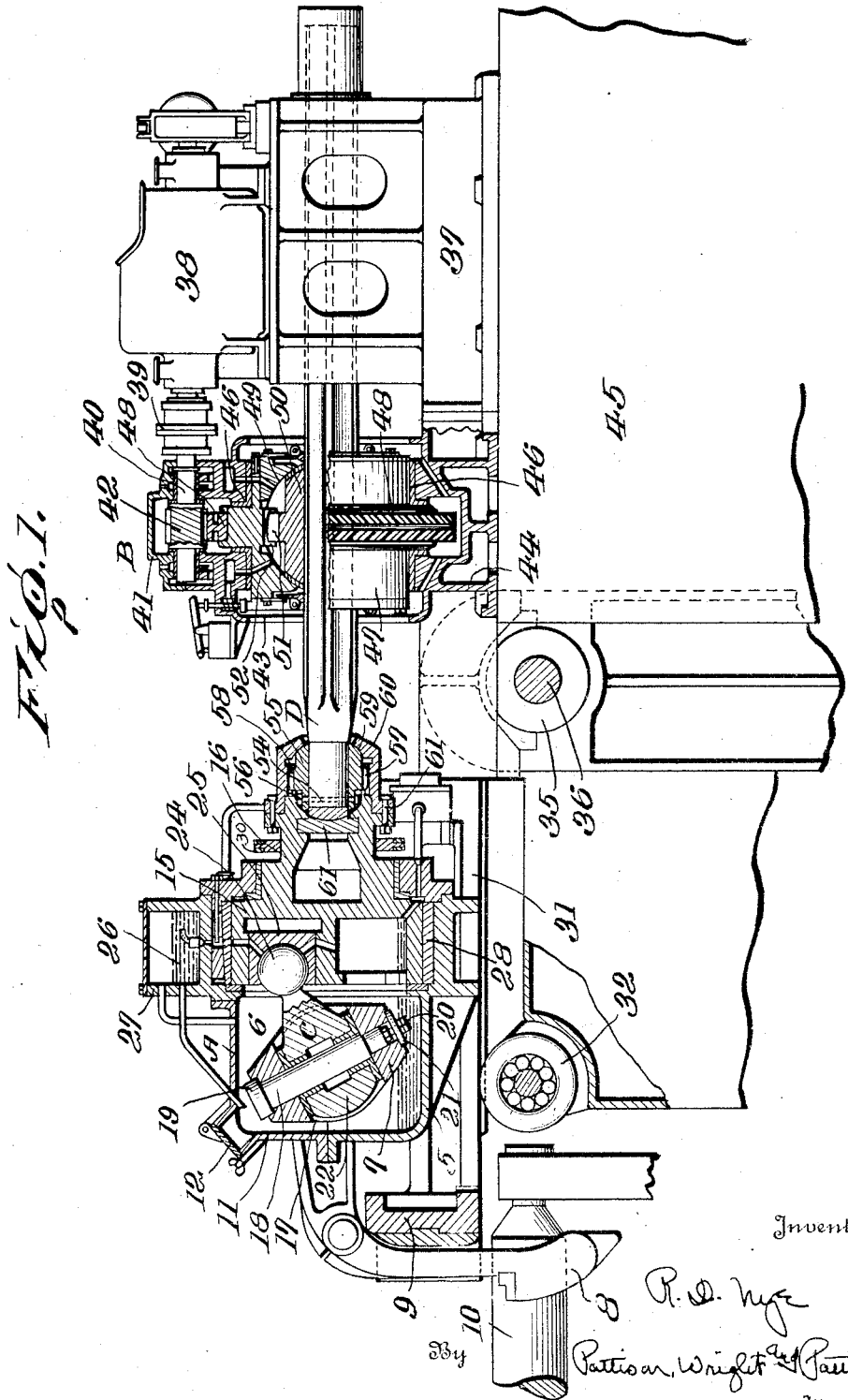
Inventor
R. D. Nye
By Pattison, Wright and Pattison
Attorneys

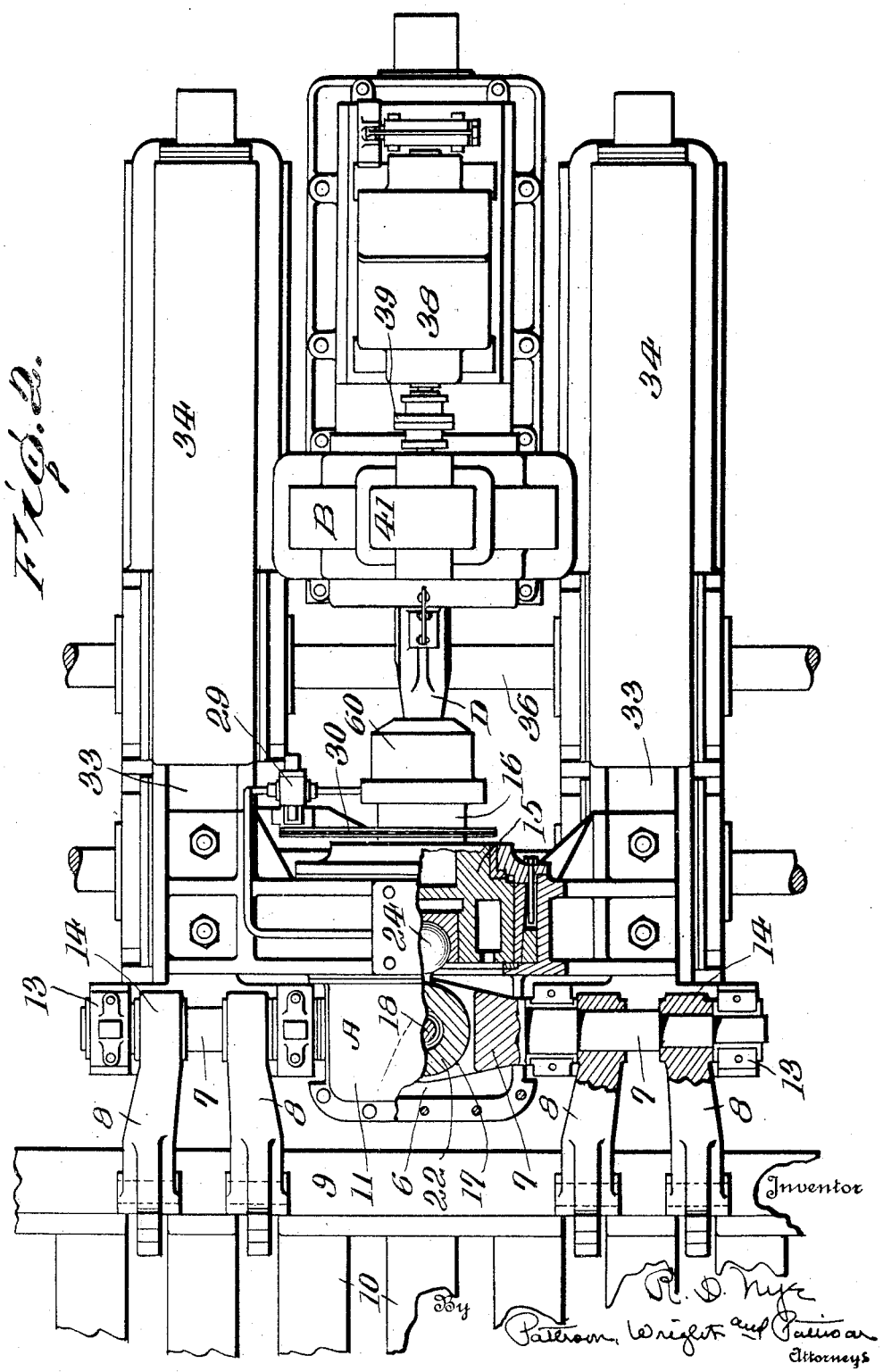

Patented Mar. 29, 1932

1,851,921

UNITED STATES PATENT OFFICE

RALPH D. NYE, OF WHEELING, WEST VIRGINIA, ASSIGNOR TO WHEELING MOLD & FOUNDRY DIVISION OF THE CONTINENTAL ROLL & STEEL FOUNDRY COMPANY, OF WHEELING, WEST VIRGINIA, A CORPORATION OF DELAWARE

MANIPULATOR FOR ROLLING MILLS

Application filed October 1, 1930. Serial No. 485,746.

This invention relates to improvements in manipulators for rolling mills and the driving mechanism therefore and is an improvement over the construction appearing in the John A. Hellstrom Patent No. 1,618,707 dated February 22nd, 1927, and the pending John A. Hellstrom patent application No. 89,108 filed February 18, 1926, entitled Universal joints.

The patent and the pending application enumerated above deal with a rolling mill manipulator wherein there are a series of manipulator fingers connected with a shaft through the oscillation of which the fingers are lifted and lowered. A so-called universal joint connects this rock shaft with a rotary shaft driven by a stationary motive power means and this universal joint converts the rotary motion of the driven shaft into an oscillating drive for the oscillating shaft carrying the manipulator fingers.

The present invention deals with an improvement in the oil-tight housing in which the universal joint is mounted as well as an improved construction of the universal joint itself together with an improvement in the connecting means between the rotary driven shaft and the universal joint and said driven shaft and the stationary motive power for this shaft.

Accordingly the primary object of the invention is the provision of an improved drive for a manipulator for rolling mills.

A further object of the invention is that of an improved housing construction for the universal connection of the manipulator drive and an improved construction for the universal connection itself.

Another and further object of the invention is that of providing an improved construction of connecting the driven shaft with the universal connection and with the stationary motive power for the drive shaft.

Other novel features of construction, improved results and beneficial advantages of the invention will appear from the following description taken in conjunction with the accompanying drawings.

In the drawings:

Figure 1 is a vertical sectional view through the manipulator and the drive therefor, a portion of the figure being shown in side elevation.

Fig. 2 is a top plan view of the device appearing in Figure 1 of the drawings, a portion of the view being broken away and shown in horizontal section.

It will be understood that in a manipulator for rolling mills there are the mill table rollers which receive the ingot to be manipulated and that at one side of this table there is provided a manipulator head carrying a series of fingers for engaging and manipulating the ingot upon the table rolls, and that to enable a proper manipulation of the ingots the manipulator head is reciprocated in a horizontal direction transverse the table. This manipulator head carries the manipulator fingers together with a mechanism adapted to lift and lower the fingers while there is a stationary motive power for driving the head mechanism which operates the manipulator fingers. By reason of this construction it is necessary that the manipulator fingers operating mechanism which moves as a part of the manipulator head have a movable yet constantly positive driving connection with the stationary motive power means.

With the foregoing broad description of a rolling mill manipulator in mind, reference will now be had to the drawings wherein it will be seen that the manipulator head as a whole is designated at A and the stationary motive power means at B. That part which is termed the universal connection or joint is designated at C and the rotary driven shaft appears at D.

The manipulator head comprises a casting 5 having therein a chamber 6 in which the universal joint or connection C is positioned and through which passes the oscillating shaft 7 which runs transverse the device and upon which are supported the manipulator fingers 8 which are of a length and shape to extend forwardly beyond the guard 9 and to assume, when in their lowered positions, a position beneath the top of the mill table rolls 10. This housing 5 is intended to be oil-tight and is closed by a suitable cap or cover 11 having an oil filler opening 12.

The transverse rock shaft 7 extends beyond the housing 5 at each side thereof and is supported at its ends in a suitable bearing 13 at each side of the head and by reference to Figure 2 of the drawings it will be seen that the manipulator fingers 8 are suitably attached as at 14 to the outwardly extending ends of the shaft.

The rear end of the housing 5 is open and mounted rotatably therein is a wheel or disc 15 having a shaft portion 16 which extends outwardly and rearwardly through the open end of the housing.

That portion of the shaft 7 within the chamber 6 of the housing 5 is enlarged and provided with an eye 17 and through the shaft and eye passes a pin 18 having at one end an enlarged head 19 while its opposite end is adjustably connected by screw-bolt 20 which passes through and bears against a washer 21 seated in a suitable depression in the outer face of the shaft.

A pitman 22 surrounds the pin 19 within the eye 17 of the rock shaft and is rotatable on the pin and in the eye. This pitman is provided with an extension having a ball shaped end 24 which is seated in a suitable bearing 25 eccentrically positioned in the face of the wheel or disc 15. By reason of the parts described thus far it will be seen that when the wheel or disc 15 is rotated the pitman 22 will impart to the shaft 7 an oscillating or rocking movement which is the movement necessary to this shaft to cause it to lift the manipulator fingers.

The driving mechanism thus far described is well lubricated as clearly indicated in Figure 1 of the drawings in that oil 26 carried in a reservoir 27 formed as a part of the casting 5 is led to the ball shaped end of the pitman, to the pin 18, and to the bearing 28 on which the wheel or plate 15 rotates. As a matter of fact a pump 29 driven by a chain 30 off the shaft portion 16 of the wheel or plate 15 assures a forced feed circulation of lubricant.

The manipulator head including the manipulator fingers and the guard are all supported upon a deck or base 31 the front end of which is supported upon a suitable roller bearing 32 while the rear end of the deck carries rearwardly extending racks 33 which pass rearwardly through housings 34 and in which they are engaged by gears 35 mounted on and driven by the transverse shaft 36 with the result that the bridge carrying the entire manipulator head can be reciprocated in a horizontal manner transverse the mill table rollers.

At the rear of the device upon a suitable stationary base 37 there is mounted a motor 38 coupled as at 39 to a shaft 40 which is rotatably supported within a suitable housing 41 and within said housing carries a herring-bone gear 42. This housing 41 is provided with a circular opening 43 and the base of the housing 44 is attached to a suitable supporting medium 45 which incidentally also supports the base 37 and motor 38.

Within the opening 43 of the housing 41 there is rotatably supported upon suitable bearings 46 a drum 47 having exteriorly of its face a herring-bone ring gear 48 which meshes with the herring-bone gear 42 of the motor shaft extension 40 and is driven thereby. This drum 47 is provided interiorly with a spherical shaped opening or chamber 49 within which is mounted a spherical self-aligning toothed coupling 50 provided with teeth 51 having a curved outer edge which engage teeth 52 which extend inwardly from the inner face of the spherical opening 49 of the rotary drum. The spherical shaped toothed coupling 50 is provided with a squared opening through which extends the squared drive shaft D which is elongated to extend to a point considerably in the rear of the rotary drum and the spherical toothed coupling and also extends forwardly beyond the same for attachment to the hub portion 16 of the wheel or plate 15.

At this front end 54 the drive shaft D carries a spherical self-aligning toothed coupling 55 which is bolted as at 56 to the shaft to rotate therewith. The teeth 57 of this coupling have their outer curved or arc shaped ends engaging teeth 58 carried interiorly of the spherical shaped chamber 59 of the cap 60 which is bolted as at 61 to the hub portion 16 of the plate or wheel 15. End thrust of the shaft D is taken up by a suitable thrust bearing 61 carried in the end of the wheel hub 16.

By reason of the stationary drive mechanism just described it will be seen that the driven rotary shaft D imparts to the wheel or plate 15 a rotary motion which is in turn converted into an oscillating or rocking drive for the rock shaft 17 for actuating the manipulator fingers and it will be quite evident that as the manipulator head and manipulator fingers are reciprocated by the bridge 31 through the drive shaft 36 and the gears 35 that the drive shaft D will move laterally with the manipulator head and the squared drive shaft will slide through the squared opening in the self-aligning toothed coupling 50 and will at all times maintain a driving connection between the shaft and the rotary driven drum 47.

By reason of the sliding connection of the rotary drive shaft it is possible, from a stationary motive power, to operate the manipulator fingers at any position they can be made to assume on the mill table and that for each revolution of the driven rotary shaft the rock shaft will lift the manipulator fingers up and down.

The construction set forth as comprising this invention has all of the advantages attributed to the Hellstrom patent and the Hellstrom application and additionally has other advantages among which is the single piece casting forming the housing for the manipulator head universal joint which greatly simplifies this casting and at the same time strengthens it over the two-piece casting disclosed in the Hellstrom patent and the Hellstrom application heretofore mentioned.

By the use of the self-aligning toothed couplings for connecting the rotary drive shaft to the rotary wheel or plate and to the stationary rotary driving drum the drive shaft is supported entirely at two points and provides a uniform bearing support for the shaft at any position and assures self-alignment of the shaft with the result that wear, breakage and up-keep is materially reduced.

It has also been found that the improved pitman and rock shaft attaching construction is a decided improvement over that specifically disclosed in the Hellstrom patent and the Hellstrom application.

By converting the rotary motive power to oscillate a shaft in the manner described the present invention constitutes a vast improvement over manipulators as now known and used in that it is possible to do away with a great many gears, links and levers which have heretofore been used due to the fact that what constitutes the rock shaft in the present invention has in manipulators heretofore been a rotary shaft necessitating links and levers to impart a lifting and lowering movement to the manipulator fingers.

Having thus described my invention, what I claim and desire to secure by Letters Patent is:

1. In combination with a feed table of a rolling mill, a rock shaft mounted to be moved laterally over said table, a revolving power shaft, a universal connection between said shafts, whereby a rocking motion is imparted to the rock shaft, said revolving power shaft having a self-aligning toothed connection with said universal connection, and manipulator fingers operatively connected with said rock shaft for manipulating work on the feed table.

2. In combination with a feed table of a rolling mill, a rock shaft mounted to be moved laterally over said table, a revolving power shaft, a universal connection between said shafts whereby a rocking motion is imparted to the rock shaft, and an externally toothed spherical shaped member carried by said power shaft having connection with a spherical internally toothed chamber carried by said universal connection to form a self-aligning connection between the power shaft and universal connection, and manipulator fingers operatively connected with said rock shaft for manipulating work upon the table.

3. In combination with a feed table of a rolling mill, a rock shaft mounted to be moved laterally over said table, a stationary motive power means including a rotary member formed with a spherical opening carrying therein a driven spherical member, a power shaft having movable progressive engagement with said spherical shaped member of the power drive, a universal connection between said power shaft and said rock shaft whereby a rocking motion is imparted to the rock shaft, and manipulator fingers operatively connected to said rock shaft for manipulating work on the table.

4. In combination with a feed table of a rolling mill, a rock shaft mounted to be moved laterally over said table, a stationary motive power means including a rotary member having therein a spherical opening carrying a spherical self-aligning bearing having toothed connection with said rotary member to be positively driven therewith, a power shaft having movable progressive engagement with said spherical self-aligning bearing, a universal connection between the rock shaft and the power shaft for imparting a rocking motion to the rock shaft, said universal connection provided with an internally toothed spherical shaped member carried by and rotatable with said power shaft to form between the universal connection a power shaft and self-aligning toothed driving connection, and manipulator fingers operatively connected with said rock shaft for manipulating work on the table.

5. An improved drive mechanism comprising a fixed power means and a driven means movable in respect thereto, comprising a power shaft inter-connecting the two means, said fixed power means having a rotatable member provided with a spherical-shaped chamber carrying a spherical self-aligning bearing rotatable with the rotary member, said driven means provided with a spherical chamber adapted to receive and have driving connection with a spherical self-aligning bearing carried by and rotatable with the said power shaft, and said power shaft having movable progressive driving engagement with the spherical self-aligning bearing of the driven rotary member of the stationary power means, for the purpose described.

6. A drive connection between a fixed motive power means and a driven means movable in respect thereto, comprising a power shaft, said fixed motive power means including a driven rotary member having an internally toothed spherical chamber carrying therein a spherical externally toothed bearing the teeth of which engaging the teeth of the spherical chamber to provide positive driving connection between the bearing and the driven rotary member, said driven means provided with an internally toothed spherical shaped chamber adapted to receive an externally toothed spherical shaped self-aligning bearing carried by and rotatable with the power shaft to form a positive driving connection between the power shaft and the driven member and said power shaft having movable progressive driving engagement with the spherical shaped toothed bearing of the stationary movable power means, for the purpose described.

7. A universal joint connection for rolling mill manipulators and the like, comprising an oscillating shaft and revolving power shaft having its inner end removed from said oscillating shaft, the inner end of the power shaft provided with a rotary member, the rotary member of the power shaft provided with an eccentric pitman bearing, a pitman having its free end in said eccentric bearing and provided with a hub, said oscillating shaft provided with an eye to rotatably receive said pitman hub, and a pin extending through said oscillating shaft eye and said pitman hub, whereby the parts operate as described.

8. In combination with a rolling mill manipulator or the like, having an oscillating shaft and a rotary power shaft, the inner end of the power shaft removed from said oscillating shaft and provided with a driven enlargement, a housing encircling the shaft enlargement and forming a supporting bearing therefor, a pitman having one end eccentrically connected to the shaft enlargement and its other end formed as a hub, said oscillating shaft passing through said housing and in said housing provided with an eye adapted to rotatably receive the hub of said pitman, and a pin passing through said oscillating shaft and said pitman hub, the parts operating as described.

9. A drive for rolling mill manipulators or the like, comprising a stationary power means and a driven means horizontally movable in respect thereto, a power shaft having connection with the movable driven means and having movable progressive driving engagement with the fixed power means, and the connections of the shaft with the stationary power means and the driven means being universal and self-aligning, for the purpose described.

10. In combination with a feed table of a rolling mill, a rock shaft mounted to be moved laterally over said table, a revolving power shaft, a universal connection between said shafts, whereby a rocking motion is imparted to the rock shaft, said revolving power shaft having a self-aligning connection with said universal connection, and manipulator fingers operatively connected with the said rock shaft for manipulating work on the feed table.

In testimony whereof I hereunto affix my signature.

RALPH D. NYE.